Aug. 11, 1959
E. R. WELLS
CATTLE GUARD
2,899,174
Filed Nov. 8, 1957
3 Sheets-Sheet 2
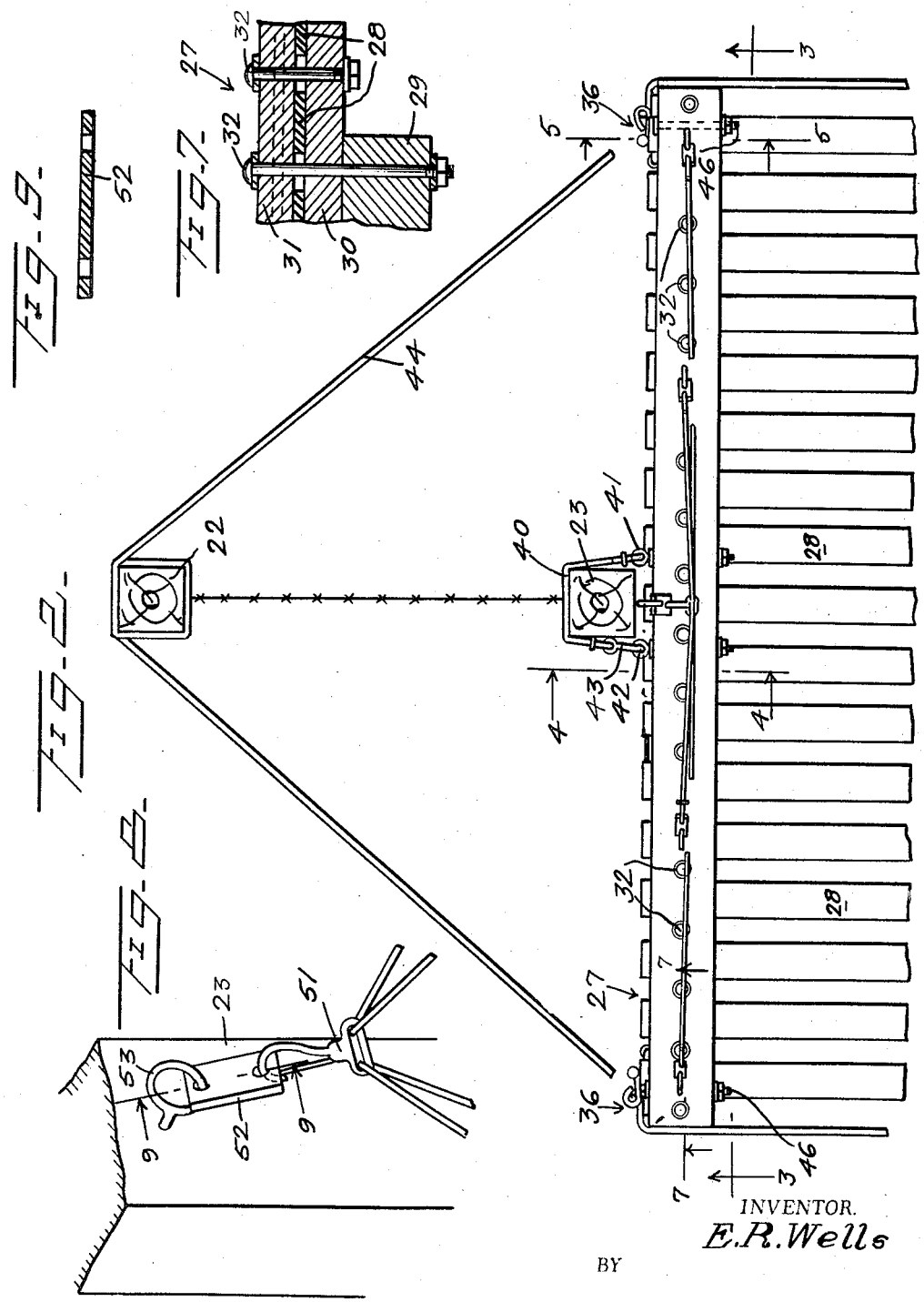
INVENTOR.
E.R. Wells
BY
Kimmel & Crowell ATTYS.

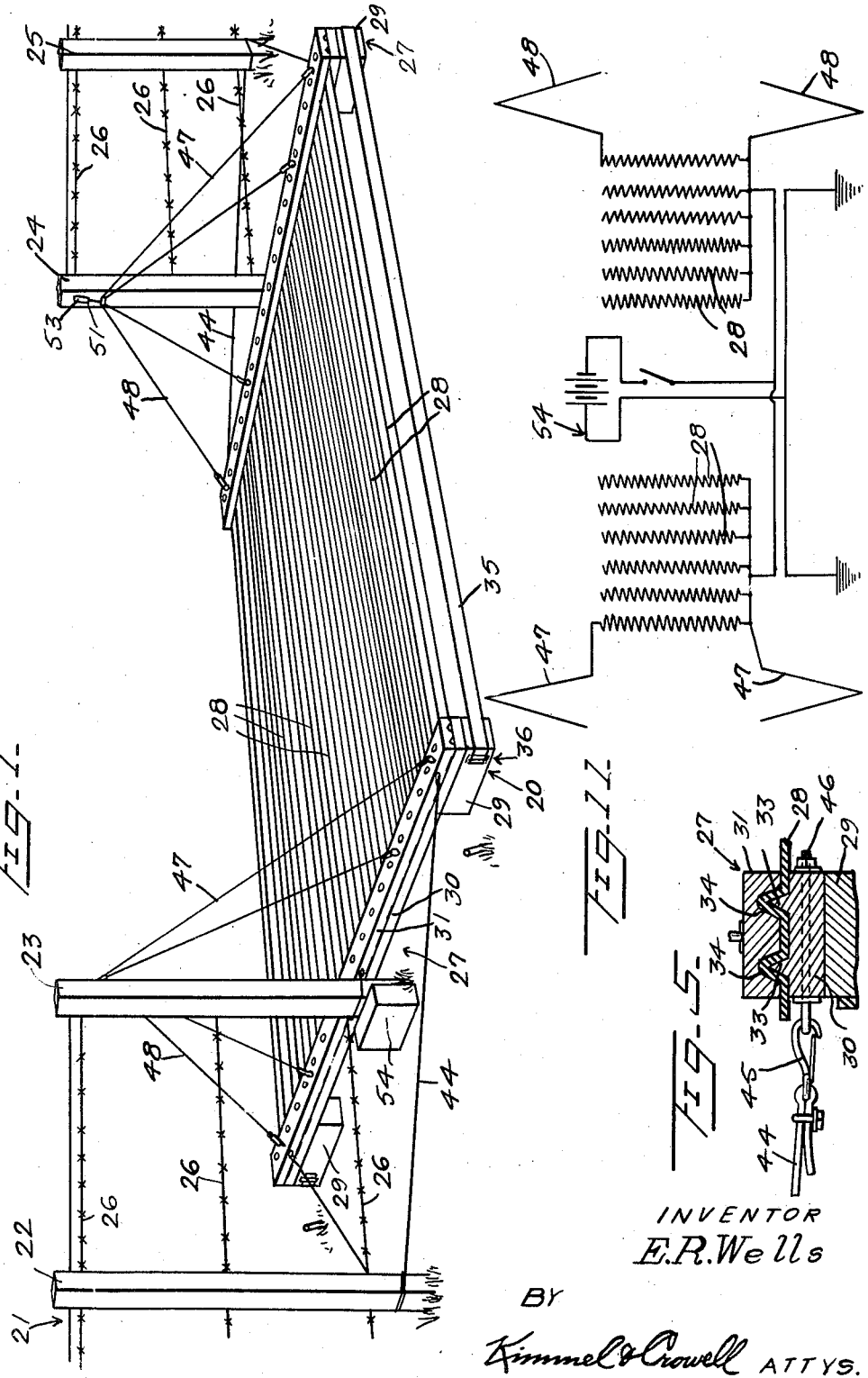

Aug. 11, 1959 — E. R. WELLS — 2,899,174
CATTLE GUARD
Filed Nov. 8, 1957 — 3 Sheets-Sheet 3
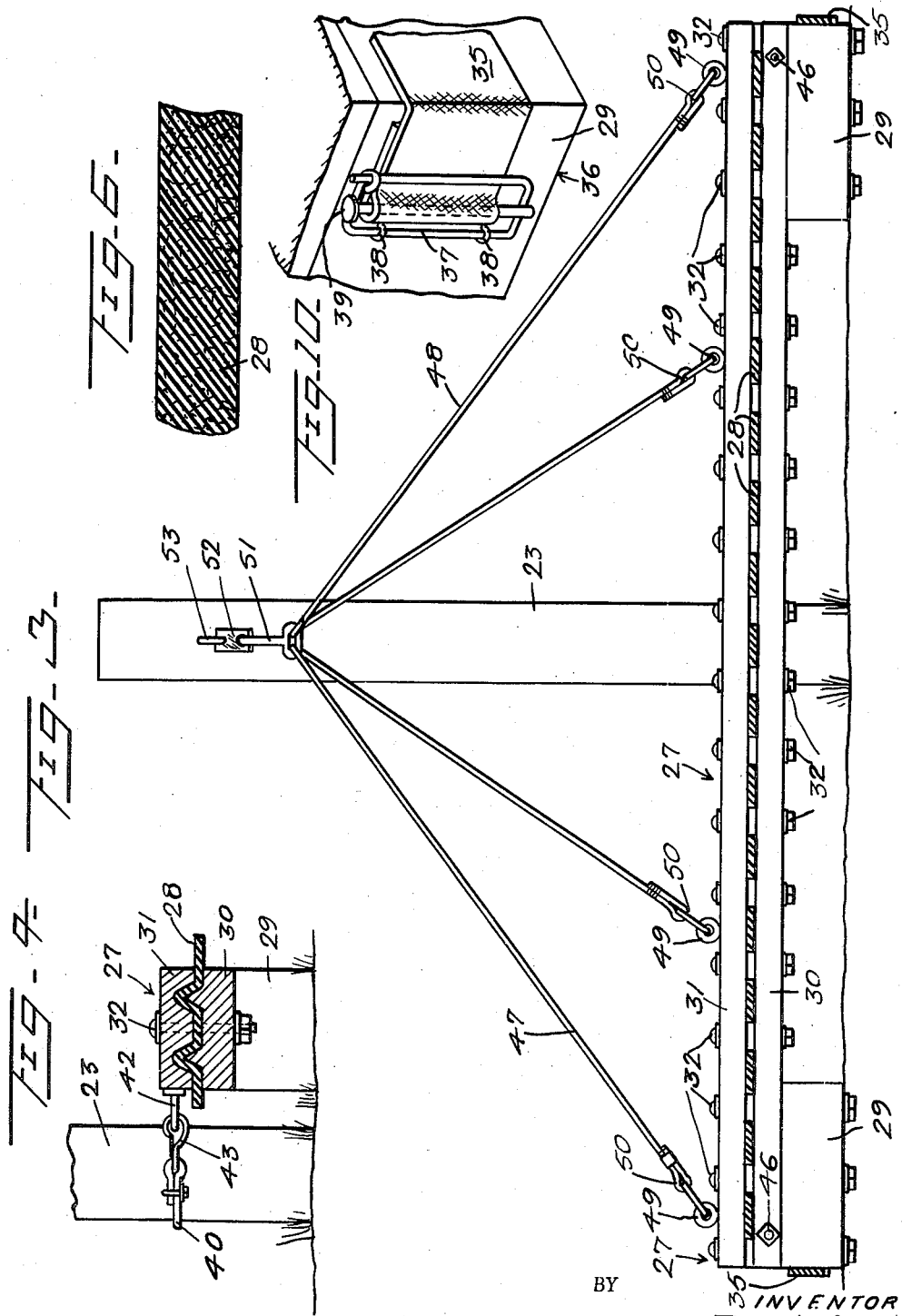
INVENTOR
E. R. Wells
BY Kimmel & Crowell
ATTYS.

United States Patent Office 2,899,174
Patented Aug. 11, 1959

2,899,174

CATTLE GUARD

Ernest R. Wells, Joseph, Oreg.

Application November 8, 1957, Serial No. 695,246

4 Claims. (Cl. 256—10)

The present invention relates to cattle guards, and more particularly to cattle guards of the type which permit the passage of vehicles while effectively preventing the passage of cattle.

The primary object of the invention is to provide a cattle guard arranged in a fence over which a vehicle can move without damage to the vehicle or to the guard and which is positioned for instant use by a vehicle at all times.

Another object of the invention is to provide a cattle guard of the class described above having electrical shocking barriers forming a part thereof.

A further object of the invention is to provide a cattle guard of the class described above which can be used without injury to the cattle and will completely bar the passage of cattle therethrough.

Other objects and advantages will become apparent in the following specification when considered in the light of the attached drawings, in which:

Figure 1 is a perspective view of the invention shown installed in a fence.

Figure 2 is a fragmentary top plan view of the invention.

Figure 3 is a transverse cross-section taken along the line 3—3 of Figure 2, looking in the direction of the arrows.

Figure 4 is an enlarged fragmentary vertical cross-section taken along the line 4—4 of Figure 2, looking in the direction of the arrows.

Figure 5 is an enlarged fragmentary vertical cross-section taken along the line 5—5 of Figure 2, looking in the direction of the arrows.

Figure 6 is a sectional view of one of the elastic bands.

Figure 7 is an enlarged fragmentary vertical cross-section taken along the line 7—7 of Figure 2, looking in the direction of the arrows.

Figure 8 is a fragmentary perspective view of one of the end barrier supports.

Figure 9 is a longitudinal cross-section taken along the line 9—9 of Figure 8, looking in the direction of the arrows and illustrating one of the insulator supports removed from the end barrier support.

Figure 10 is a fragmentary perspective of one corner of the device.

Figure 11 is a wiring diagram.

Referring now to the drawings in detail wherein like reference characters indicate like parts throughout the several figures, the reference numeral 20 indicates generally a cattle guard constructed in accordance with the invention.

The cattle guard 20 is used in conjunction with a fence line, generally indicated at 21, which includes a plurality of spaced apart fence posts 22, 23, 24 and 25, as illustrated in Figure 1, and additional posts (not shown) to extend the fence 21 the desired distance.

The posts 22, 23 are connected by vertically spaced wires 26, and the posts 24, 25 are similarly connected by vertically spaced wires 26. The posts 23, 24 are spaced apart a sufficient distance to permit the passage of a vehicle therebetween, and the cattle guard 20 is positioned on the ground between the posts 23, 24 centrally of the fence 21 so as to extend outwardly on both sides of the fence 21.

The cattle guard 20 includes a pair of spaced parallel frames generally indicated at 27, and a plurality of spaced parallel longitudinally extending elastic members 28 extending between the end frames 27.

Each end frame 27 includes a pair of spaced apart support blocks 29, a lower clamp plate 30 having its opposite end supported on the support blocks 29, an upper clamp plate 31 arranged parallel to the clamp plate 30 in overlying relation thereto, and a plurality of laterally spaced bolts 32 securing the clamp plates 30, 31 together and to the support blocks 29.

The lower clamp plate 30 has a pair of inverted V-shaped ribs 33 arranged in spaced parallel upstanding relation on the upper surface thereof and extending from one end of the clamp 30 to the other. The upper clamp plate 31 has, in the lower face thereof, a pair of spaced apart inverted V-shaped grooves 34 arranged in overlying relation to the V-shaped ribs 33.

The flexible members 28 are clamped between the lower clamp plate 30 and the upper clamp plate 31 by means of the bolts 32 with the ribs 33 and grooves 34 providing sufficient frictional grip for the end of the flexible member 28 to prevent its removal from between the clamp plates 30, 31.

The flexible members 28 adjacent the side edges of the cattle guard 20 are provided with embedded metal particles of a nature such that the flexible member 28 is a conductor of electricity.

A flexible strip 35 is arranged in upright relation on each side of the cattle guard 20 and has the opposite ends thereof secured to the blocks 29 by means of buckles generally indicated at 36. The buckle 36 includes a closed wire loop 37 secured to the block 29 by staples 38 and has the doubled end of the flexible strip 35 extending therethrough and locked therein by means of a headed pin 39, as best shown in Figure 10. The strip 35 is a non-conductor of electricity.

Referring now to Figures 1 and 2, one of the frames 27 is secured to the post 23 by means of a flexible band 40 having one end secured to the frame 27 by an eye bolt 41 and connected to the frame 27 at the other end by means of an eye bolt 42 and a detachable buckle 43.

A somewhat longer flexible band 44 extends from adjacent the opposite ends of the frame 27 and engages about the post 22. The flexible band 44 is provided with buckles 45 on each end thereof which engage an eye bolt 46 at each end of the frame 27.

Electrically conductive end barrier cables 47 and 48 are secured to the frame 27 by means of eye bolts 49 and a buckle 50 secured to each of the free ends of the cables 47 and 48. A single detachable buckle 51 is threaded on both of the cables 47, 48 to secure the mid-points of the cables 47, 48 to an insulator 52 depending from a mounting eye 53 supported on the post 23 substantially above the frame 27.

An electric fence unit 54 is positioned adjacent one of the frames 27 and electrically connected to each of the electrically conductive flexible members 28 and each of the cables 47, 48 to provide an electric circuit therein, as shown in Figure 11. The wiring of the cables 47, 48 and the electric conductive flexible members 28 is in accordance with standard electric fence wiring practices wherein one side of the circuit is connected to ground and the opposite side of the circuit connected to the cables 47, 48 and the flexible members 28 so that an animal walking on the ground and contacting one of the flexible members 28 or cables 47, 48 will complete a circuit therefrom to the ground and be shocked thereby.

The barrier cables 47, 48 prevent the cattle from passing around the end of the frames 27. A vehicle may pass directly over the flexible members 28 and the flexible members 35 with the wheels of the vehicle pressing the flexible members 28 and 35 against the ground as the vehicle passes thereover.

In the event that it is desired to drive cattle through the opening in the fence 21, the frame 27 can be disengaged from the post 24 by releasing the buckles 51, 43 and 45 to permit one frame 27 to be moved adjacent the other frame 27 so that the flexible members 28 and 35 are removed from the path of the cattle desiring to pass through the fence 21.

The reference herein to "cattle" is intended to include not only cattle but also hogs, sheep and horses.

Having thus described the preferred embodiment of the invention, it should be understood that numerous structural modifications and adaptations may be resorted to without departing from the scope of the appended claims.

What is claimed is:

1. A cattle guard comprising a pair of spaced apart parallel lower clamp plates, an upper clamp plate overlying each of said lower clamp plates, said upper and lower clamp plates having inter-engaging ribs and grooves formed on their adjacent faces, means extending through upper and lower clamp plates in laterally spaced relation releasably securing said plates in clamping relation, a plurality of spaced parallel longitudinally extending flat electric conductive members having their opposite ends releasably secured between said respective upper and lower clamp plates, means securing said clamp plates to an adjacent fence post with said members arranged in closely spaced relation to the ground, and means connecting said members to a source of electricity to provide an electric shock system for cattle.

2. A device as claimed in claim 1 wherein electric barrier cables have their lower ends secured to opposite ends of each of said upper clamp plates and extend upwardly and inwardly therefrom, and means detachably securing the upper ends of said barrier cables to said post.

3. A device as claimed in claim 1 wherein means are provided underlying opposite ends of each of said lower clamp bars for supporting said lower clamp bars in spaced relation with respect to the ground.

4. A device as claimed in claim 3 wherein longitudinally extending elastic members have their opposite ends secured to the means supporting said clamp plates at opposite ends of said clamp plates and extending between the spaced apart clamp plates parallel to said electric conductive members.

References Cited in the file of this patent

UNITED STATES PATENTS

| | | |
|---|---|---|
| 2,555,180 | Adkins | May 20, 1951 |
| 2,575,987 | York et al. | Nov. 20, 1951 |
| 2,769,617 | Hutchinson | Nov. 6, 1956 |